United States Patent
Ahne

(10) Patent No.: US 10,067,895 B2
(45) Date of Patent: Sep. 4, 2018

(54) SYSTEMS AND METHODS FOR ASYNCHRONOUS TOGGLING OF I2C DATA LINE

(71) Applicant: Lexmark International, Inc., Lexington, KY (US)

(72) Inventor: Adam Jude Ahne, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 389 days.

(21) Appl. No.: 14/729,858

(22) Filed: Jun. 3, 2015

(65) Prior Publication Data

US 2016/0357691 A1    Dec. 8, 2016

(51) Int. Cl.
*G06F 13/40* (2006.01)
*G06F 13/362* (2006.01)
*G06F 1/12* (2006.01)

(52) U.S. Cl.
CPC .............. *G06F 13/362* (2013.01); *G06F 1/12* (2013.01)

(58) Field of Classification Search
CPC ............... G06F 13/4282; G06F 2213/0016
See application file for complete search history.

(56) References Cited

U.S. PATENT DOCUMENTS

| | | | |
|---|---|---|---|
| 4,689,740 A | 8/1987 | Moelands | |
| 9,059,906 B1* | 6/2015 | McCleland | ............. H04L 43/08 |
| 9,213,396 B1* | 12/2015 | Booth | ................ G06F 13/4291 |
| 9,298,908 B1* | 3/2016 | Booth | .................... G06F 21/44 |
| 9,710,419 B2* | 7/2017 | Hug | .................... G06F 13/4282 |
| 2008/0147941 A1 | 6/2008 | Deshpande | |
| 2013/0019039 A1 | 1/2013 | Herklots | |
| 2013/0132626 A1 | 5/2013 | Furlan | |
| 2014/0025851 A1 | 1/2014 | Descesaris | |
| 2014/0173162 A1 | 6/2014 | Danis | |
| 2015/0339257 A1* | 11/2015 | Hug | .......................... H04L 5/16 710/110 |

OTHER PUBLICATIONS

Lee W. Young, PCT International Search Report PCT/US 16/34087, Aug. 26, 2016, ISA/US, Alexandria, Virginia.
International Preliminary Report on Patentability, PCT/US2016/034087, International filing date May 25, 2016; report dated Dec. 5, 2017.

* cited by examiner

*Primary Examiner* — Brian T Misiura

(57) ABSTRACT

A method of operating an I2C slave having an I2C clock pin and an I2C data pin is disclosed. The method includes (a) receiving a command via the I2C clock pin and the I2C data pin, (b) driving the I2C data pin to logic low for a first duration, (c) not driving the I2C data pin to logic low for a second duration, and (d) repeatingly alternating (b) and (c) until a termination event occurs. (b) and (c) are not synchronized to transitions of the I2C clock pin. Other methods and systems are disclosed.

14 Claims, 3 Drawing Sheets ved only by the appended claims and their equivalents.
SYSTEMS AND METHODS FOR ASYNCHRONOUS TOGGLING OF I2C DATA LINE

CROSS REFERENCES TO RELATED APPLICATIONS

None.

BACKGROUND

1. Field of the Disclosure

The present disclosure relates generally to integrated circuit interface protocols and more particularly to Inter-Integrated Circuit (I2C) serial communication.

2. Description of the Related Art

There exist a number of integrated circuit interface protocols in which a master communicates with a slave device over a serial bus. Interface protocol I2C is an exemplary interface protocol in which a master communicates with one or more slave devices over a shared serial bus. The master initiates communications with slaves. Thus, the slave cannot communicate with the master to, for example, wake the master from a low-power sleep mode.

SUMMARY

The invention, in one form thereof, is directed to an I2C slave having an I2C clock pin and an I2C data pin. The I2C slave is configured to receive a command at the I2C clock pin and the I2C data pin and in response repeatedly toggle the I2C data pin until the I2C slave detects the occurrence of a termination event. The toggling is asynchronous to the I2C clock pin.

The invention, in another form thereof, is directed to an I2C slave having a power pin, an I2C clock pin, and an I2C data pin. The I2C slave is configured to be powered via the power pin and to receive a command transmitted via I2C using the I2C clock pin and the I2C data pin then repeatedly toggle the I2C data pin until the power pin is de-energized. The toggling is asynchronous to the I2C clock pin.

The invention, in yet another form thereof, is directed to a method of operating an I2C slave having an I2C clock pin and an I2C data pin. The method includes (a) receiving a command via the I2C clock pin and the I2C data pin, (b) driving the I2C data pin to logic low for a first duration, (c) not driving the I2C data pin to logic low for a second duration, and (d) repeatingly alternating (b) and (c) until a termination event occurs. (b) and (c) are not synchronized to transitions of the I2C clock pin.

The invention, in another form thereof, is directed to an I2C device having an I2C clock pin, an I2C data pin, and an input pin. The I2C device is configured to respond to receiving an I2C command via the I2C clock pin and the I2C data pin by alternating between driving the I2C data pin to logic low and not driving the I2C data pin to logic low until the I2C device detects a termination event. The alternating is not synchronized to transitions of the I2C clock pin.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
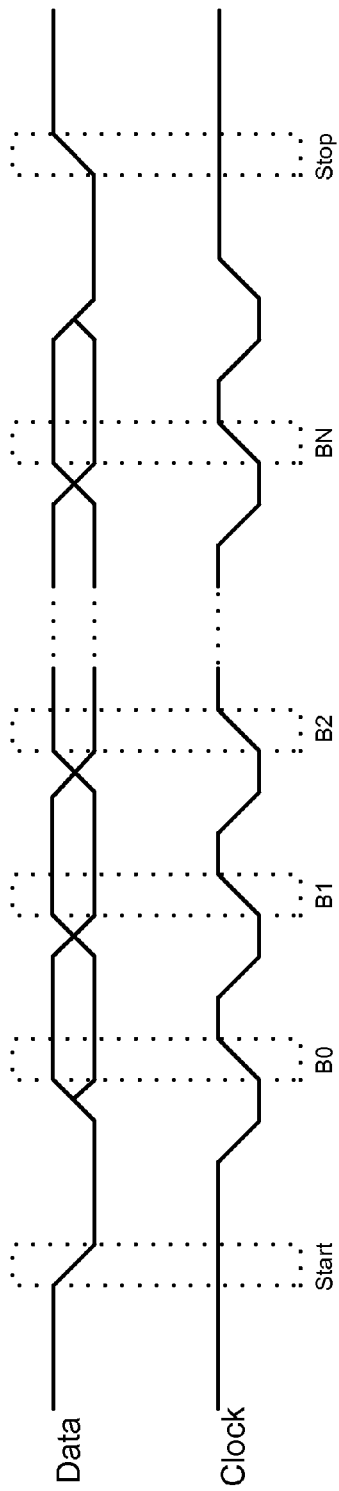
FIG. 1 is a signal-timing diagram of an I2C communication.

Referring to the drawings and particularly to FIG. 1, there is shown a signal-timing diagram of an I2C communication as is known in the art. An I2C data line and an I2C clock line are shown at logic high, logic low, and transitioning between logic high and logic low. A start condition is defined as the data line transitioning from logic high to logic low, i.e. a falling transition, while the clock line is logic high. Thereafter, the data line only transitions when the clock line is logic low. Thus, transitions of the data line are synchronized to falling transitions of the clock line. The state of the data line is read when the clock line transitions from logic low to logic high i.e. a rising transition. As shown, bit B0 is read on a rising transition of the data line. Subsequent bits B1-BN are read on subsequent rising transitions of the clock line. Note that bits may be read by either the master or the slave. The bits may encode an I2C address, indication of whether the communication is a read from the slave or a write to the slave, and data such as a command. For example, bits B0-B6 may be a slave address, bit B7 may be a read/write indicator, bits B8-B15 may be a command, and bits B16-B23 may be data that is part of the command. The communication is terminated by a stop condition, which is defined as a rising transition of the data line while the clock line is logic high. The stop condition is synchronized to the clock line to occur after the final bit is transmitted.

Figure 2:
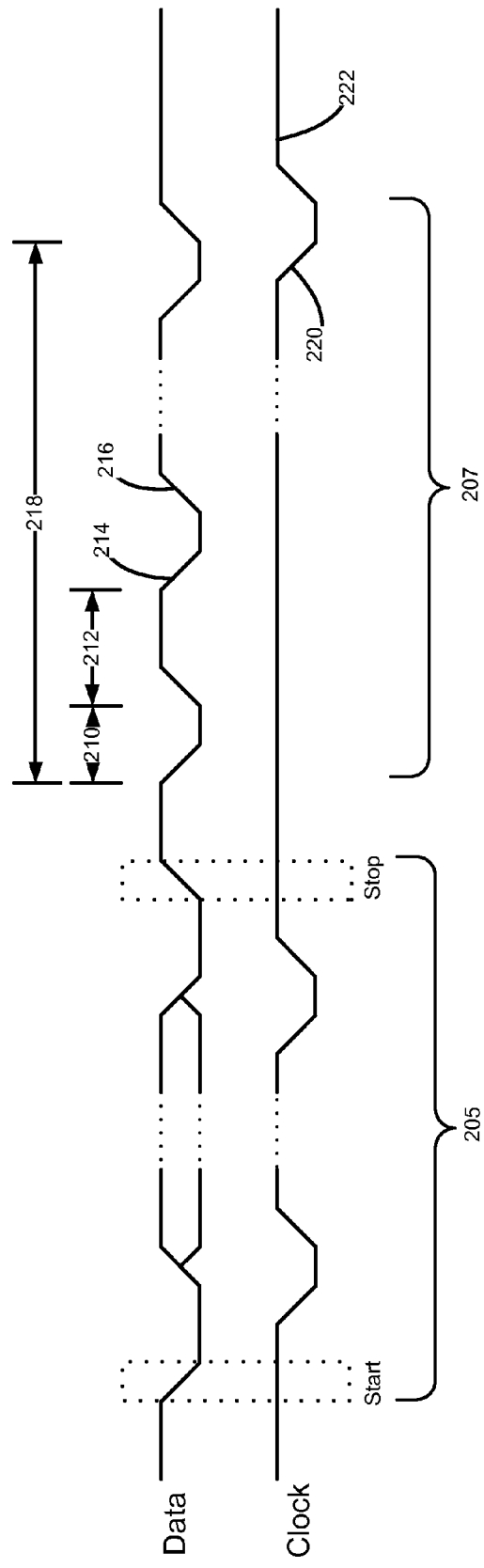
FIG. 2 is a signal-timing diagram according to one aspect of the present disclosure.

Prior art I2C communication is synchronized to a clock line driven by a master. Thus, the slave cannot communicate with the master to, for example, wake the master from a low-power sleep mode. FIG. 2 shows a signal timing diagram according to one embodiment of the present disclosure that overcomes these shortfalls of prior art I2C communication systems without adding additional connections and associated cost.

The left portion 205 of FIG. 2 shows an I2C communication that starts with a start condition and ends with a stop condition similar to the waveforms in FIG. 1. In this example, the I2C communication contains a command from the master to the slave. The command is for the slave to toggle the data line until a termination event occurs. The right portion 207 of FIG. 2 shows that, in response to the I2C communication, the slave toggles the data line by driving the data line to a logic low for a first duration 210 then releases the data line so that a pull-up resistor (not shown bringsthe data line to a logic high for a second duration 212. A toggle contains both a falling edge and a rising edge. The data line falling transitions, e.g. falling transition 214, and rising transitions, e.g. rising transition 216, occur asynchronously to the clock line. In this example, the clock line is logic high during the toggling. The toggling repeats for a plurality of cycles.

The ratio of the second duration 212 to the first duration 210 is known as a duty cycle. The slave may adjust the duty cycle of the toggling to communicate information i.e. pulse width modulation (PWM). The duty cycle of the toggling may be, for example, proportional to a voltage output of a sensor coupled to the slave e.g. a temperature sensor. Circuitry coupled to the data line, external to the master and the slave, may read the duty cycle to read the value of the temperature sensor.

The cycle time, i.e. the first duration 210 plus the second duration 212, determines the frequency of the toggling. Some sensors output a frequency such as, for example, humidity sensors. The cycle time may be proportional to the output frequency of a sensor.

The command may include a frequency value and the slave may perform the toggling at a frequency specified by the frequency value. This is useful when, for example, the slave adjusts the toggling duty cycle in response to a sensor output. The frequency may be set based on the cutoff frequency of a low-pass filter coupled to the data line. The command may include a duty cycle value and the slave may perform the toggling at a duty cycle specified by the duty cycle value. This is useful when, for example, the slave adjusts the toggling frequency in response to a sensor output.

The slave continues to toggle the I2C data line until a termination event occurs. The termination event may be a falling edge 220 of the clock line. After the termination event, the clock line becomes logic high 222 and the I2C bus is available for I2C communications such as is shown in FIG. 1. The master necessarily has the capability to drive the clock line to a logic low because this capability is required for I2C communications. Thus, it is not a burden for the master to generate a termination event by manipulating the clock line.

The termination event may be the toggling has exceeded a maximum duration 218. The command may include a value of the maximum duration. In this way, the slave will automatically relinquish control of the data line once the maximum duration has occurred. This removes the burden from the master to generate a termination event. The termination event may be the toggling has exceeded a maximum number of logic level transitions and the command includes a value of the maximum number of transitions. Similarly, this also removes the burden from the master to generate a termination event.

Alternatively, the slave may simply continue toggling the I2C data line until the slave is de-energized. Once the slave is re-energized, it is available for I2C communication.

It is advantageous to toggle the data line instead of the clock line so other devices on the I2C bus do not interpret the toggling as an I2C transmission. Since the I2C clock line is high during the toggling, other I2C slaves will interpret the toggling as a series of I2C start conditions and I2C stop conditions. The I2C slaves will not react to these events because they will not receive a command addressed to their I2C address.

Receiving a command via the I2C clock pin and I2C data pin may occur after the termination event occurs. In this embodiment, the slave may begin toggling the data line automatically after powering up.

Figure 3:
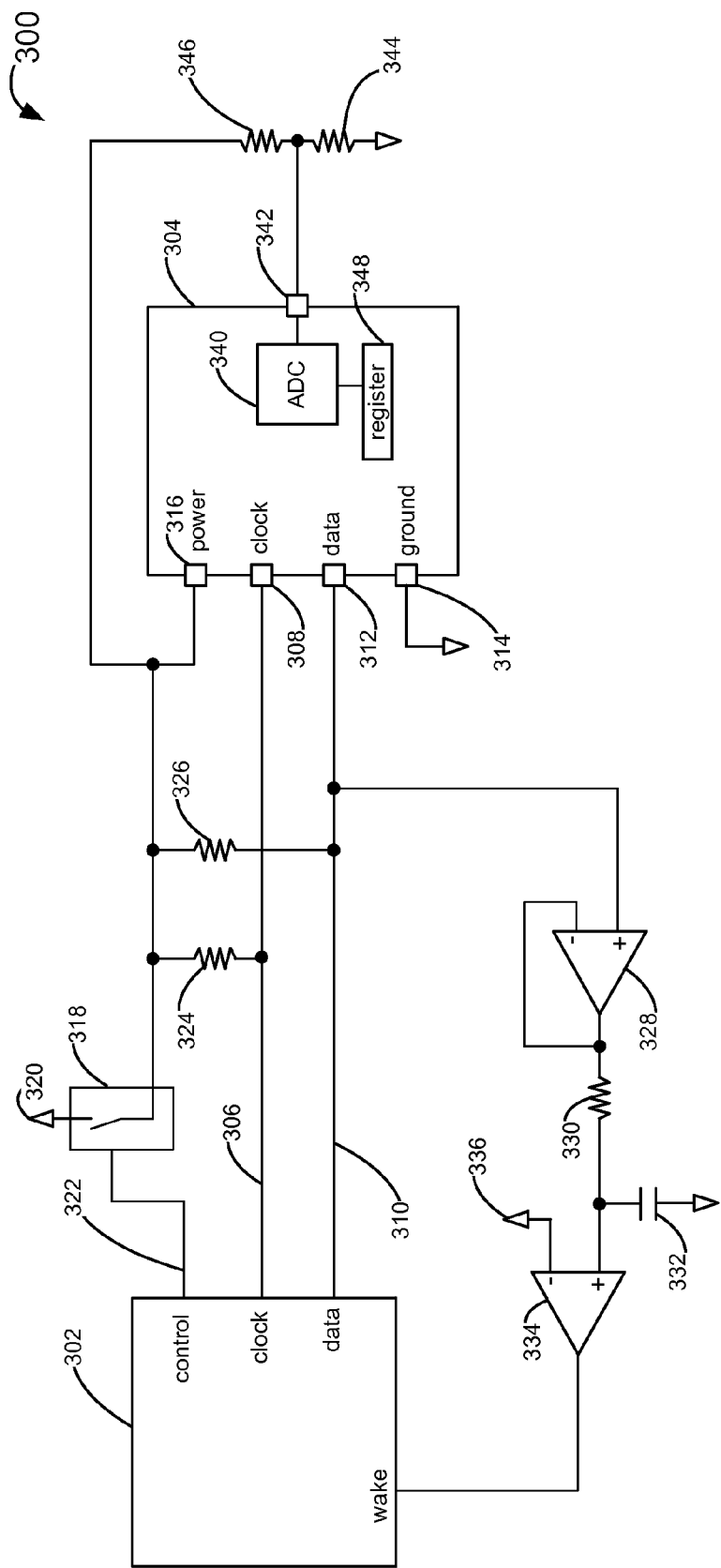
FIG. 3 is a schematic diagram according to another aspect of the present disclosure.

FIG. 3 shows a schematic diagram according to another aspect of the present disclosure. A serial communication system 300 has an I2C master 302 and an I2C slave 304. The master 302 has an open-collector I/O connected to an I2C clock line 306 connected to an I2C clock pin 308 of the slave 304. The master 302 has an open-collector I/O connected to an I2C data line 310 connected to an I2C data pin 312 of the slave 304. The slave 304 has a ground pin 314 connected to system ground and a power pin 316 connected to a switch 318 connected to a voltage supply 320, e.g. 3.3V. The switch 318 may be, for example, a transistor. A control line 322 coupled to the master 302 controls the switch 318. Pull-up resistors 324 and 326 connect the output of the switch 318 to the clock line 306 and the data line 310. The master 302 may energize and de-energize the slave 304 using the switch 318.

The data line 310 is also connected to the input of an op-amp 328 configured as a unity-gain buffer. The output of op-amp 328 is connected to a low-pass filter made of a series resistor 330 and a capacitor 332 to ground. The output of the low-pass filter is connected to an input of a comparator 334. Another input of the comparator 334 is connected to a voltage reference 336. The output of the comparator 334 is connected to a wake input 338 of the master configured to wake the master from sleep when the wake input 338 is driven high.

The slave contains an analog-to-digital converter (ADC) 340. The ADC input pin 342 is connected to a thermistor 344 biased by the output of the switch 318 via a pull-up resistor 346. The voltage at the ADC input pin 342 is related to the resistance of the thermistor 344 which is related to the temperature of the thermistor 344. A digital output of the ADC is connected to a duty cycle register 348 which may be, for example, a hardware register, a memory cell, etc.

In operation, the master turns on the switch 318 via the control line 322, sends a command to the slave, then goes into a low-power sleep mode. The command is in an I2C communication sent to the slave via the clock line 306 and the data line 310. In response, the slave toggles the I2C data pin 312 by alternating between driving the I2C data pin 312 to logic low and not driving the I2C data pin to logic low as shown in FIG. 2. The master is asleep and thus ignores the toggling of the data line 310. The duty cycle of the toggling is proportional to the duty cycle register 348. The op-amp 328 drives the low-pass filter, which converts the AC signal to a DC signal since the cut-off frequency of the low-pass filter is much lower than the frequency of the toggling. If the output of the low-pass filter is greater than the voltage reference 336, which corresponds to an excessive temperature measured by the thermistor, the output of the comparator 334 goes high, the wake input 338 goes high, and the master 302 wakes from sleep. The master 302 responds by pulsing the clock line 306 low, the slave 304 detects this event and stops toggling the data pin 312 and the data line 326 is pulled to a logic high by the pull-up resistor 326. The master may now initiate I2C communication on the clock line 306 and data line 310.

The serial communication system 300 uses the same I2C data line 310 for I2C communication synchronized to the I2C clock line 306 and for asynchronous transmissions of PWM information to analog circuits. This dual usage of the I2C data line 310 enables the master to go to sleep and to wake based on the data line PWM signal.

Note that the low-pass filter cutoff frequency may be set much lower than the I2C clock frequency e.g. the cutoff frequency may be 100 Hz and the I2C clock frequency may be 100 kHz. In this configuration, the toggling of the I2C data pin may occur continuously and I2C communication may occur while the I2C data pin is logic high. The relatively short duration, high frequency burst of I2C communication will not significantly change the output of the low-pass filter. In this example, I2C communications are synchronized to the toggling of the I2C data pin.

Figure 4:
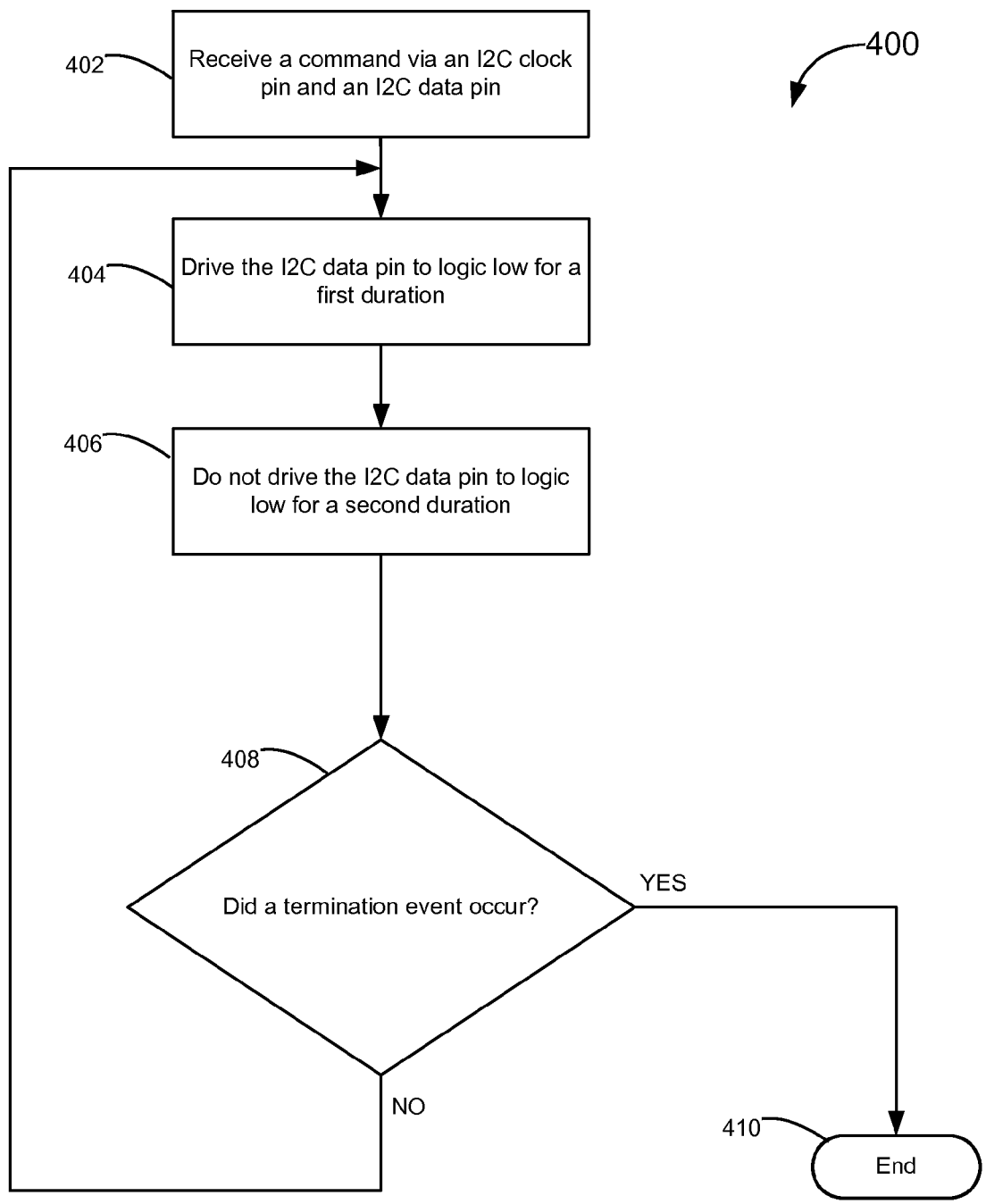
FIG. 4 is a flowchart of a method of operating an I2C shave device according to another aspect of the present disclosure.

FIG. 4 shows a method 400 of operating an I2C slave according to another aspect of the present disclosure. The I2C slave has an I2C clock pin and an I2C data pin.

At block 402, the slave receives a command via the I2C clock pin and the I2C data pin. At block 404, the slave drives the I2C data pin to a logic low for a first duration. At block 406, the slave does not drive the I2C data pin to a logic low for a second duration. Not driving the I2C data pin will result in a logic high, since in I2C systems the data pin has a pull-up resistor to a logic high voltage. Repeating blocks 404 and 406 will produce the waveform shown in the right portion 207 of FIG. 2.

At block 408, the slave determines if a termination event occurred. If not, blocks 404 and 406 are repeated. If a termination event did occur, the method ends at block 410. The termination event may be, for example, the I2C clock pin transitions to a logic low, the I2C clock pin is logic low, etc. The command may include a maximum duration and the termination event may be that the total time blocks 404 and 406 have occurred exceeds the maximum duration. The command may include a maximum number of occurrences that blocks 404 and 406 have occurred and the termination event may be that block 404 and 406 have occurred more than the maximum number of occurrences. The termination event may be that the I2C slave is de-energized.

The command may include a frequency value and block 404 and 406 are repeated at a frequency specified by the frequency value. The command may include a duration value and the first duration may be based on the duration value. Alternatively, the command may include a duration value and the sum of the first duration and the second duration may be based on the duration value.

Note that block 402 may occur after block 408 in place of block 410. In this embodiment, the I2C data pin is toggled until a termination event occurs and then the slave receives a command via the I2C clock pin and the I2C data pin. In this embodiment, the slave may, after a power cycle, automatically start toggling the I2C data pin until a termination event occurs. This would be useful in systems where the master starts in sleep mode after a power cycle and the toggling wakes the master as described above.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

What is claimed is:

1. An I2C slave having an I2C clock pin and an I2C data pin, the I2C slave is configured to receive a command at the I2C clock pin and the I2C data pin and in response repeatedly toggle the I2C data pin until the I2C slave detects the occurrence of a termination event, wherein the toggling is asynchronous to the I2C clock pin, also having a duty cycle register wherein the I2C slave is configured to perform the toggling at a duty cycle proportional to a value in the duty cycle register, and an analog-to-digital converter having an analog input and a digital output and the duty cycle register is coupled to the digital output.

2. The I2C slave of claim 1, wherein the termination event is the I2C clock pin transitions to logic low from logic high.

3. The I2C slave of claim 1, wherein the termination event is the I2C clock pin is logic low.

4. The I2C slave of claim 1, wherein the command includes a frequency value and the I2C slave is configured to perform the toggling at a frequency specified by the frequency value.

5. The I2C slave of claim 1, wherein the termination event is the toggling has exceeded a maximum duration and the command includes a value of the maximum duration.

6. The I2C slave of claim 1, wherein the termination event is the toggling has exceeded a maximum number of logic level transitions and the command includes a value of the maximum number of transitions.

7. An I2C slave having a power pin, an I2C clock pin, and an I2C data pin, the I2C slave is configured to be powered via the power pin and to receive a command transmitted via I2C using the I2C clock pin and the I2C data pin then repeatedly toggle the I2C data pin until the power pin is de-energized, wherein the toggling is asynchronous to the I2C clock pin, also having a duty cycle register wherein the I2C slave is configured to perform the toggling at a duty cycle proportional to a value in the duty cycle register, and an analog-to-digital converter and the duty cycle register is coupled to an output of the analog-to-digital converter.

8. The I2C slave of claim 7, wherein the command includes a frequency value and the I2C slave is configured to perform the toggling at a frequency specified by the frequency value.

9. An I2C device having an I2C clock pin, an I2C data pin, and an input pin, the I2C device is configured to respond to receiving an I2C command via the I2C clock pin and the I2C data pin by alternating between driving the I2C data pin to logic low and not driving the I2C data pin to logic low until the I2C device detects a termination event, wherein the alternating is not synchronized to transitions of the I2C clock pin, also having a duty cycle register wherein the I2C slave is configured to perform the alternating at a duty cycle proportional to a value in the duty cycle register, and an analog-to-digital converter having an analog input and a digital output and the duty cycle register is coupled to the digital output.

10. The I2C device of claim 9, wherein the termination event is the I2C clock pin transitions to logic low.

11. The I2C device of claim 9, wherein the termination event is the I2C clock pin is logic low.

12. The I2C device of claim 9, wherein the command includes a frequency value and the I2C slave is configured to perform the alternating at a frequency corresponding to the frequency value.

13. The I2C device of claim 9, wherein the termination event is the alternating has exceeded a maximum duration and the command includes a value corresponding to the maximum duration.

14. The I2C device of claim 9, wherein the termination event is the alternating has exceeded a maximum number of transitions and the command includes a value corresponding to the maximum number of transitions.

* * * * *